US008470731B2

(12) United States Patent
Fukaya et al.

(10) Patent No.: US 8,470,731 B2
(45) Date of Patent: Jun. 25, 2013

(54) OIL ADSORBENT, AND METHOD FOR RECOVERING THE SAME

(75) Inventors: Taro Fukaya, Nerima-ku (JP); Shinetsu Fujieda, Kawasaki (JP); Shinji Murai, Sagamihara (JP); Akiko Suzuki, Tokyo (JP); Hideyuki Tsuji, Yokohama (JP); Tatsuoki Kohno, Tokyo (JP); Arisa Yamada, Ota-ku (JP); Nobuyuki Ashikaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 434 days.

(21) Appl. No.: 12/708,899

(22) Filed: Feb. 19, 2010

(65) Prior Publication Data
US 2010/0230358 A1    Sep. 16, 2010

(30) Foreign Application Priority Data

Mar. 11, 2009 (JP) ................. 2009-058751

(51) Int. Cl.
*B01J 20/02* (2006.01)
(52) U.S. Cl.
USPC ........................................ 502/406; 502/526
(58) Field of Classification Search
USPC ............ 502/402, 406, 439, 518, 526, 527.14, 502/527.24
See application file for complete search history.

(56) References Cited

U.S. PATENT DOCUMENTS

| 6,468,942 B1 * | 10/2002 | Sansalone ..................... 502/402 |
| 2009/0277843 A1 | 11/2009 | Fukaya et al. |
| 2009/0314717 A1 | 12/2009 | Fujieda et al. |

FOREIGN PATENT DOCUMENTS

| JP | 55-22312 | 2/1980 |
| JP | 60-97087 | 5/1985 |
| JP | 3-201509 | 9/1991 |
| JP | 7-102238 | 4/1995 |
| JP | 2000-176306 | 6/2000 |
| JP | 2000-319022 | 11/2000 |

OTHER PUBLICATIONS

U.S. Appl. No. 12/708,846, filed Feb. 19, 2010, Fukaya, et al.
Office Action issued Dec. 7, 2011, in Chinese Patent Application No. 201010125282.X (with English-language translation).

* cited by examiner

*Primary Examiner* — Edward Johnson
(74) *Attorney, Agent, or Firm* — Oblon, Spivak, McClelland, Maier & Neustadt, L.L.P.

(57) ABSTRACT

An oil adsorbent includes a plurality of particles, each being constituted from at least one of an inorganic particle and an organic particle as a core and a polymer covering the core. The plurality of particles are aggregated to form an aggregate so that a porosity of the aggregate is 70% or more.

17 Claims, No Drawings

OIL ADSORBENT, AND METHOD FOR RECOVERING THE SAME

CROSS-REFERENCE TO THE INVENTION

This application is based upon and claims the benefit of priority from the prior Japanese Patent Application No. 2009-058751, filed on Mar. 11, 2009; the entire contents of which are incorporated herein by reference.

BACKGROUND OF THE INVENTION

1. Field of the Invention

The present invention relates to an oil adsorbent for recovering an oil from a water and a method for recovering the same.

Recently, the effective utilization of water source is required because of the industrial development and the population growth. In this point of view, it is very important to reuse a waste water such as an industrial waste water. The reuse of the waste water can be realized by purifying the waste water, that is, separating other contents from the waste water except the water.

Various methods are known as a method for separating other contents from a liquid. For example, membrane separation, centrifugal separation, activated carbon adsorption, ozone treatment, agglomeration and suspended matter removal with adsorbent can be exemplified. The use of such a method as mentioned above can remove chemical materials such as a phosphorous component and a nitrogen component contained in a water which affect the environment remarkably, and can remove an oil and a clay dispersed in the water.

Among the separating methods as mentioned above, the membrane separation is one of the most commonly used separating methods, but may be likely to be suffer from the clogging of the fine pores of the membrane in the case of the removal of the oil dispersed in the water, causing the disadvantage that the lifetime of the membrane is shortened. In this point of view, the membrane separation is not appropriate for the removal of the oil from the water. As a method for removing the oil such as a heavy oil, therefore, such a removing method as collecting the heavy oil floating on the water surface with an oil boom provided on the water surface which utilize the floating property of the heavy oil, adsorbing and recovering the floating heavy oil is utilized. Alternatively, such a removing method as laying hydrophobic materials with absorptivity for the heavy oil on the water surface, adsorbing and recovering the floating heavy oil is utilized.

Recently, in this point of view, such an attempt as using an oil adsorbent is made. Concretely, the oil adsorbent is immersed in the water containing the oil dispersed therein so as to adsorb the oil and then, the oil adsorbent with the adsorbed oil is removed from the water. For example, Reference 1 teaches that an oil adsorbent made of magnetic particles and organic components such as resins provided on the corresponding surfaces of the magnetic particles is used so as to adsorb and remove the oil from the water. In this method, however, the dispersion of the oil adsorbent is not excellent so that the oil adsorbent tends to be settled down or floated on the water surface. Therefore, the oil cannot be adsorbed and removed efficiently and effectively by the oil adsorbent.

Moreover, Reference 2 teaches that the oil is adsorbed by the adsorbing polymer as an oil adsorbent which includes a hydrophilic block and a hydrophobic block, and the adsorbing polymer with the adsorbed oil is removed from the water. In this method, however, the separation between the adsorbing polymer and the water is difficult and more, the adsorbing polymer with the adsorbed oil is softened, causing the deterioration of workability.

On the other hand, Reference 3 teaches that the oil is adsorbed by the magnetized adsorbing particles so that the adsorbing particles with the adsorbed oil are separated by means of magnetic force. For example, the surfaces of the magnetic particles are modified by stearic acid such that the oil in the water is adsorbed and recovered by the magnetic particles. In this method, however, since the surfaces of the magnetic particles are modified by stearic acid or coupling agent of low molecular weight, the low molecular weight component may contaminate the water adversely.

With all of the removing methods as described in References 1 to 3, since the oil adsorbent is disposed after the adsorption of the oil, the use efficiency of the oil adsorbent is low. Moreover, if the oil adsorbent is not up to standard, the oil adsorbent is disposed as it is. In this point of view, the use efficiency of the oil adsorbent is deteriorated. As a result, a relatively large amount of oil adsorbent is required in order to adsorb and remove the oil to be removed, resulting in the increase in cost relating to the oil removing operation inherently.

[Reference 1] JP-A 60-97087 (KOKAI)
[Reference 2] JP-A 07-102238 (KOKAI)
[Reference 3] JP-A 2000-176306 (KOKAI)

BRIEF SUMMARY OF THE INVENTION

An aspect of the present invention relates to an oil adsorbent, including: a plurality of particles, each being constituted from at least one of an inorganic particle and an organic particle as a core and a polymer covering the core, wherein the plurality of particles are aggregated to form an aggregate so that a porosity of the aggregate is 70% or more.

DETAILED DESCRIPTION OF THE INVENTION

Hereinafter, the present invention will be described in detail.

(Oil Adsorbent)

The adsorbent in this embodiment is configured such that at least one of an inorganic particle and a metallic particle constitutes a core and a polymer covers the core to form an aggregate as the adsorbent. Since the inorganic particle and the metallic particle constitute the core of the adsorbent, the inorganic particle and the metallic particle are appropriately selected from an inorganic material and a metallic material which are not chemically changed when the inorganic material and the metallic material are immersed in a water for a long period of time.

For example, the inorganic material and the metallic material may be a ceramic material such as molten silica, crystalline silica, glass, talc, alumina, silicate calcium, calcium carbonate, barium sulfate, magnesia, silicon nitride, boron nitride, aluminum nitride, magnesium oxide, beryllium oxide or mica, or a metallic material such as aluminum, iron, copper or an alloy thereof. Alternatively, the materials may be an oxide such as magnetite containing a metallic material listed above, titanic iron, magnetic pyrite, magnesia ferrite, cobalt ferrite, nickel ferrite or barium ferrite.

It is desired that the core is shaped in polyhedron form, preferably such as at least one of hexahedron form and octahedron form. If the core is shaped in the polyhedron form as described above, the porosity of the aggregate as the adsorbent in this embodiment can be easily set to 70% or more.

It is not always required that the corners of the polyhedron form of the core are acute. The corners of the polyhedron form may be cut off. Alternatively, only if the polyhedron form can be specified, some defects may be formed at the core. In other words, only if the main surfaces defining the polyhedron form are recognized, the polyhedron form of the core will do.

The polyhedron core can be formed through crystal growth. Concretely, the polyhedron core can be formed below. First of all, an alkaline water solution is reacted with $Fe^{2+}$ ion (constituting the core) of a ferrous salt water solution to form a reactive solution, and an oxygen gas or an air is blown into the reactive solution while the pH value of the reactive solution is controlled. In this case, if the pH value of the reactive solution is set within a range of 8 to 9, the core is likely to be shaped in the hexahedron form, and if the pH value of the reactive solution is set to 10 or more, the core is likely to be shaped in the octahedron form (refer to JP-A 03-201509 (KOKAI) and JP-A 2000-319022 (KOKAI).

Moreover, as described below, in view of the advantage of the collection of the adsorbent, it is desired that the inorganic particle and the metallic particle contain a magnetic material.

Although the magnetic material is not limited, it is desired that the magnetic material exhibits ferromagnetism at around room temperature. However, a magnetic material commercially available such as iron, alloy containing iron, magnetite, titanic iron, magnesia ferrite, cobalt ferrite, nickel ferrite or barium ferrite may be employed.

Among them, the ferrite-based compound can exhibit the intention of the present invention effectively. For example, since the magnetite ($Fe_3O_4$) is not expensive and stable as a magnetic material by itself and in water, the magnetite can be easily and preferably employed for the water treatment.

In this embodiment, the inorganic particle and the metallic particle may be constituted from a magnetic substance. In this case, the magnetic substance is a magnetic powder, and the shape of the magnetic powder may be set in the form of polyhedron such as hexahedron or octahedron as described above. Normal plating treatment such as Cu plating or Ni plating may be conducted for the magnetic particle as occasion demands. Moreover, the surface of the magnetic particle may be treated so as to prevent the corrosion of the magnetic particle.

The magnetic substance may be constituted from the combination which is made by combining the magnetic particles with a binder such as a resin instead of constituting the magnetic substance directly as the magnetic powder. Namely, the configuration of the magnetic substance is not particularly limited if the magnetic substance generates the magnetic force enough to collect the adsorbent containing the magnetic substance.

The size of the magnetic powder is changed on various conditions such as the density of the magnetic powder, the kind and density of the polymer covering the magnetic powder, and the kind and amount of functional group. In this embodiment, however, the average diameter of the magnetic powder is set within a range of 0.05 to 100 µm and preferably within a range of 0.2 to 5 µm. The average diameter is measured by means of laser diffraction. Concretely, the average diameter is measured with the SALD-DS 21 Type measuring apparatus (trade name) made by Shimadzu Corporation.

Here, when the magnetic powder is shaped in the polyhedron form, the size of the magnetic powder means a largest portion of the structure of the magnetic powder. For example, if the magnetic powder is shaped in the octahedron form, the size of the magnetic powder means the height or the width of the structure of the magnetic powder.

If the average diameter of the magnetic powders is set larger than 100 µm, the size of the aggregated particle containing the magnetic powders becomes too large so that the dispersion of the aggregated particle in water tends to be deteriorated in the recovery of the oil. Moreover, the effective surface of the aggregated particle is decreased so that the adsorbing amount of the oil tends to be undesirably decreased. If the average diameter of the magnetic powders is set less than 0.05 µm, the magnetic powders as primary particles are aggregated densely so that the surface of the thus obtained resin complex, that is, the aggregate as the adsorbent in this embodiment tends to be undesirably decreased.

The preferable average diameter of the magnetic powders can be applied for the inorganic particles such as ceramic particles and the non-magnetic metallic particles. The application of the preferable average diameter for the inorganic particles and the non-magnetic metallic particles can exhibit the same effect/function as the application of the preferably average diameter for the magnetic powders.

In this embodiment, the polymer covering the core of the adsorbent which is made of the inorganic particle or the like is preferably constituted from a polymer material with high lipophilicity. In this case, the oil adsorption capacity of the oil adsorbent in this embodiment can be increased.

In this point of view, a polymer containing as a main structure at least one selected from the group consisting of styrene, butadiene, isoprene, acrylonitrile, alkyl acrylate and alkyl methacrylate may be employed as the polymer covering the core in the adsorbent of this embodiment. The polymer covering the core may be constituted as a single polymer made from only one selected from the group listed above, a copolymer made from two or more selected from the group listed above, or a polymer alloy made from two or more selected from the group listed above.

In this embodiment, it is required that the porosity of the aggregate as the adsorbent is set to 70% or more. Therefore, the adsorbent can exhibit excellent oil adsorption capacity by the synergy effect of the lipophilicity of the polymer covering the core as a constituent of the adsorbent and the high porosity of the aggregate inherently constituting the adsorbent.

In order to realize the porosity of 70% or more of the aggregate, the space between the adjacent cores as the constituent particles of the aggregate is enlarged, for example. In this case, that the core is shaped in polyhedron form such as hexahedron form or octahedron form is effective for the enlargement of the space between the adjacent cores. The polyhedron core inevitably enlarges the space between the adjacent cores, which is originated from that in the case that the core is shaped in the polyhedron form, even though a portion (e.g., an edge) of one core becomes proximate to a portion (e.g., an edge) of the adjacent core, the remnant of the one core is almost away from the remnant of the adjacent core. Therefore, since the non-approximate portions of the adjacent cores form the space (pore), the aggregate can have such a high porosity as described above.

Therefore, in the case that the number of plane of the core is increased so that the core is shaped in almost spherical form, since the ratio and size of the non-approximate portions of the adjacent cores are decreased, the porosity of the aggregate as the adsorbent is also decreased.

The upper limit of the porosity of the aggregate is not limited only if the effect/function of the porosity can be exhibited as described above. However, the upper limit of the porosity may be set to 95%, for example. If the upper limit of the porosity is set larger than 95%, it may be that the aggregate cannot maintain the inherent structure.

Here, the porosity of the aggregate encompasses the porosity originated from the space between the adjacent constituent particles, that is, the cores of the aggregate in addition to the porosity of only the aggregate. The porosity can be measured by any kind of measuring means, but may be measured by mercury penetration method, for example. Alternatively, the porosity can be measured by measuring the bulk specific gravity of the aggregate, which can be obtained by rendering a container with a predetermined volume full of the aggregates and measuring the weight of the container with the charged aggregates. Thereafter, the bulk specific gravity of the aggregate is calculated by the volume of the container and the measured weight of the container with the charged aggregates so that the porosity can be measured by dividing the calculated bulk specific gravity by the true density.

The size of the aggregate as the adsorbent is preferably set within a range of 5 to 200 μm. If the size of the aggregate is larger than 200 μm, the aggregate may be too large to be sufficiently dispersed in a water in the recovering process of the oil. In addition, in this case, since the effective surface area of the aggregate as the adsorbent is decreased, the adsorption amount of the oil tends to be undesirably decreased. If the size of the aggregate is smaller than 5 μm, the cores (i.e., primary particles) as the constituent particles of the aggregate are aggregated densely so that the surface area of the aggregate as the adsorbent tends to be undesirably decreased.

(Manufacture of Adsorbent)

Then, the manufacturing method of the adsorbent in this embodiment will be described.

First of all, the inorganic particles or the like, the polymer and a solvent A are prepared and mixed to blend a predetermined slurry solution. Practically, the inorganic particles or the like and the polymer are dissolved in a solvent A.

The solvent A is not restricted only if the inorganic particles or the like and the polymer can be dissolved in the solvent A to form the slurry solution. Preferably, the solvent A is a polar solvent. Since the polar solvent has excellent hydrophilicity, the hydroxyl groups, which are relatively small amount, existing on the surfaces of the inorganic particles or the like have an affinity to the solvent A so that the inorganic particles or the like are not aggregated and uniformly dispersed in the solvent A.

In this embodiment, the "hydrophilicity" means a free mixing for a water, and concretely, means the state where when a pure water and a given solvent are slowly mixed at the same amount as one another and at a temperature of 20° C. under 1 atm, the thus obtained mixed solution is maintained uniformly to the sight after the flow of the mixed solution is stopped.

If the solvent A is a non-polar solvent, the solvent A has hydrophobicity (in this case, the hydrophobicity means that water solubility is 10% or less) so that the inorganic particles or the like may be aggregated and not dispersed uniformly in the slurry solution. In this point of view, in the case that the adsorbents are produced by means of splay-dry as will be described below, some of the adsorbents may not contain the inorganic particles and other of the adsorbents may contain only the inorganic particles. As a result, since some of the adsorbents are manufactured as inferior adsorbents which are not suitable for the adsorption of the oil, it is required that the inferior adsorbents are removed through many processes. Moreover, since the compositions of the inferior adsorbents are not uniform one another, the composition analysis is required to control the concentration of the slurry solution to the predetermined concentration of the intended solution so as to obtain the initial slurry solution in the reuse of the slurry solution, resulting in the complicated reuse process.

As the hydrophilic solvent, methanol, ethanol, n-propanol, isopropanol, acetone and tetrahydrofuran may be exemplified. Preferably, acetone and tetrahydrofuran are employed because these hydrophilic solvents can dissolve various polymers.

Then, the slurry solution is splay-dried. The splay-dry is conducted using splay drying method whereby particulate organic matters can be obtained from a solvent containing the corresponding particulate organic metallic matters through the removal of the organic solvent. In this embodiment, the organic matter means a resin composite particle constituted from a core made of the inorganic particle or the like and a polymer covering the core and thus corresponds to the adsorbent of the present invention.

According to the splay drying method, the average diameter in the secondary aggregates constituted from the primary particles can be adjusted by controlling the environmental temperature and splaying velocity in the implementation of the splay drying method.

In the case of the use of the splay drying method, when the organic solvent is removed from the spaces of the aggregated primary particles (i.e., the constituent particles of the aggregate), pores are formed at the aggregate. The pores contribute to the porosity of the aggregate as the adsorbent so that the porosity of 70% or more can be easily realized in the aggregate as the adsorbent.

The splay drying method may be a one well known and commercially available, but may be conducted by using a disc type splay dryer, a pressurized nozzle type dryer or a two-fluid nozzle type dryer.

(Method of Recovering Oil)

Then, the recovering method of the oil using the adsorbent(s) will be described. The oil recovering operation separates the oil from the water containing the oil. Here, the "oil" means an organic matter, which is maintained as a liquid at normal temperature and poor solubility for the water, has a relatively large viscosity and a specific gravity smaller than the water among the organic matters mixed and dispersed in the water. Concretely, animal oil or fat, vegetable oil or fat, hydrocarbon and aromatic oil may be exemplified. The exemplified oils or fats are typified by fatty acid glyceride, petroleum, higher alcohol. Since these oils or fats have the respective characteristic functional groups, the polymer composing the adsorbent and the functional groups of the adsorbent can be selected commensurate with the characteristic functional groups of the oils or fats.

First of all, the adsorbents are immersed and dispersed in the water containing the oil. As described above, since the adsorbents have the respective polymers with lipophilicity and the respective porosities of 70% or more, the adsorbents can exhibit excellent adsorption capacity for the oil. Therefore, the adsorbents can adsorb a large amount of the oil.

After the oil is adsorbed by the adsorbents, the adsorbents are separated from the water so as to separate the oil from the water. The separation of the adsorbents can be easily conducted by the settling using the force of gravity applied to the adsorbents or the centrifugal force using a cyclone separator. Moreover, when the inorganic particles or the like contain the magnetic substances, the separation of the adsorbents can be conducted by using the magnetic force of the magnetic substances.

The kind of the water to be treated in oil recovery is not restricted. Concretely, an industrial discharged water, a sewage water and a domestic waste water can be treated by the oil recovering method as described above. The concentration of the oil contained in the water to be treated is not restricted.

After the adsorbents adsorb the oil and separated from the water, the adsorbents are washed by a solvent B so as to remove the oil therefrom. The solvent B must not dissolve the polymers of the adsorbents. Concretely, the solvent B is selected so as to satisfy the condition that the solubility of the polymers for the solvent B is set to 1000 mg/L or less.

The kind of the solvent B depends on the kinds of the covering polymers of the adsorbents and the surface modification of the adsorbents. For example, methanol, ethanol, n-propanol, isopropanol, butanol, isobutanol, hexyl alcohol, cyclohexanol, acetone, methyl ethyl ketone, methyl isobutyl ketone, methyl acetate, ethyl acetate, propyl acetate, butyl acetate, diethyl ether, isopropyl ether, dibutyl ether, tetrahydrofuran, dioxane, cyclohexane, chloroform, dimethylaniline, chlorofluorocarbon, n-hexane, cyclohexanone, toluene, xylene may be exemplified.

Among the exemplified solvent, a non-polar solvent is particularly preferable. Since the non-polar solvent has hydrophobicity and high affinity to the oil, the oil adsorbed to the adsorbents can be easily and effectively washed and removed. Moreover, if the non-polar solvent is employed, the damaged adsorbents can be easily separated and removed. Here, the "hydrophobicity" means that the water solubility is 10% or less and an intended substance such as the solvent is separated from the water. Particularly, hexane is preferable because hexane can exhibit higher solubility for the oil and is stable liquid at room temperature due to the higher boiling point of about 70° C. Therefore, hexane is easy to be handled and thus, preferable.

The solvent B may be an alcohol. In this case, the moisture content adhered or adsorbed on the surfaces of the adsorbents is likely to be substituted with the alcohol so that the impurities except the oil can be easily removed. As the alcohol, methanol and ethanol are preferable because these alcohols have the respective low boiling points.

This adsorbent reusing process can be conducted by charging the adsorbents in a column and flowing the solvent B in the column, for example. Alternatively, in the case that the adsorbents contains the respective magnetic substances, the adsorbents are input into a washing vessel while a large amount of the solvent B is also input into the washing vessel, and separated with a cyclone separator or by means of magnetic force.

EXAMPLES

Then, the present invention will be described in reference with examples.

Example 1

First of all, 6 parts by weight of a polystyrene (made by JAPAN POLYETHYLENE CORPORATION, G590) was solved into 300 ml of tetrahydrofuran to form a solution. Then, 40 parts by weight of octahedron magnetite particles with an average particle diameter of 1000 nm (each specific surface being 3.0 m$^2$/g) was dispersed in the solution to form a composition, which was splayed using a mini splay dryer (made by SIBATA SCIENTIFIC TECHNOLOGY LTD., B-290 type) to form spherically aggregated resin composites, that is, adsorbent particles with an average secondary particle diameter of about 20 μm. When some of the adsorbent particles were observed by means of SEM, it was turned out that the adsorbent particles were formed in the respective porous forms. The average porosity of the adsorbent particles was 81.9% through the measurement using the Shimadzu micropore distribution measuring apparatus (Auto Pore 9520 type).

Then, the adsorbent particles were dispersed in 200 ml of a water containing an oil of 1, 1.2, 1.5 or 2.0 ml to measure the adsorption rate of the oil by the adsorbent particles. As a result, it was turned out that even though the water contained 2.0 ml of the oil, the adsorbent particles adsorbed 90% or more of the oil of 2.0 ml so that the adsorbent particles had sufficient adsorption capacity for the oil. In Examples and Comparative Examples as will be described below, if the adsorbent particles adsorbs 90% or more of the oil of 1.5 ml, it is defined that the adsorbent particles have sufficient adsorption capacity.

Examples 2, 3 and Comparative Examples 1, 2

First of all, 2 to 18 parts by weight of a polystyrene (made by JAPAN POLYETHYLENE CORPORATION, G590) were solved into 300 ml of tetrahydrofuran to form respective solutions. Then, 40 parts by weight of sphere magnetite particles with an average particle diameter of 800 nm (each specific surface area being 3.0 m$^2$/g) was dispersed in the respective solutions to form the corresponding compositions, which were splayed using a mini splay dryer (made by SIBATA SCIENTIFIC TECHNOLOGY LTD., B-290 type) to form the corresponding spherically aggregated resin composites, that is, adsorbent particles with an average secondary particle diameter of about 20 μm. When some of the adsorbent particles were observed by means of SEM, it was turned out that the adsorbent particles were formed in the respective porous forms.

The average porosities of the adsorbent particles were 74.0% (in the case of 2 parts by weight of the polystyrene relating to Example 2), 71.7% (in the case of 6 parts by weight of the polystyrene relating to Example 3), 62.5% (in the case of 12 parts by weight relating to Comparative Example 1) and 65.5% (in the case of 18 parts by weight relating to Comparative Example 2), respectively, through the measurement using the Shimadzu micropore distribution measuring apparatus (Auto Pore 9520 type).

Then, the adsorbent particles relating to Examples 2, 3 and Comparative Examples 1, 2 were dispersed in 200 ml of a water containing an oil of 1, 1.2, 1.5 or 2.0 ml to measure the adsorption rates of the oil by the adsorbent particles, respectively. As a result, it was turned out that all of the adsorbent particles relating to Examples 2, 3 and Comparative Examples 1, 2 were able to adsorb the oil of 1 ml almost perfectly (i.e., 90% or more), but the adsorbent particles with the respective porosities of less than 70% relating to Comparative Examples 1, 2 were not able to adsorb the oil of 1.2 ml almost perfectly so that the adsorption capacities of the adsorbent particles relating to Comparative Examples 1, 2 for the oil of 1.2 ml were decreased to less than 90%. In contrast, since the porosities of the adsorbent particles in Examples 2, 3 were set to 70% or more, the adsorbent particles in Examples 2, 3 were able to exhibit the respective adsorption capacities of 90% or more at the oil of 1.5 ml. The above-described results are listed in Table 1.

TABLE 1

| | POLYMER | CERAMIC SHAPE | POROSITY (%) | ABSORPTION RATE OF OIL COMPONENT (%) AMOUNT OF OIL COMPONENT CONTAINED IN WATER OF 200 mL | | | |
|---|---|---|---|---|---|---|---|
| | | | | 1.0 mL | 1.2 mL | 1.5 mL | 2.0 mL |
| EXAMPLE 1 | POLYSTYRENE | OCTAHEDRON | 81.9 | 98.4 | 99 | 99.2 | 97.2 |
| EXAMPLE 2 | POLYSTYRENE | SPHERICAL | 74 | 99.3 | 96.1 | 97.9 | 80.8 |
| EXAMPLE 3 | POLYSTYRENE | SPHERICAL | 71.7 | 98.7 | 94.7 | 90.9 | — |
| COMPARATIVE EXAMPLE 1 | POLYSTYRENE | SPHERICAL | 62.5 | 97.5 | 79.2 | — | — |
| COMPARATIVE EXAMPLE 2 | POLYSTYRENE | SPHERICAL | 65.5 | 97.1 | 83.7 | — | — |

Example 4

The intended resin complexes, that is, adsorbent particles were manufactured in the same manner as Example 1 except that hexahedron magnetite particles (each specific surface area being 3.0 m$^2$/g) were employed instead of the octahedron magnetite particles. In the adsorption test using the water containing 1.5 ml of the oil, it was turned out that the adsorption capacity of the adsorbent particles was 98.9% so that the adsorbent particles relating to this Example were able to exhibit sufficient adsorption capacity. The various conditions and the adsorption result were listed in Table 2.

Examples 5 to 10

The intended resin complexes, that is, adsorbent particles were manufactured in the same manner as Example 1 except that polymers listed in Table 2 were employed respectively instead of the polystyrene. The adsorbent particles relating to Examples 5 to 10 had respective porosities of 70% or more as listed in Table 2. In the adsorption test using the water containing 1.5 ml of the oil, it was turned out that the adsorption capacities of the adsorbent particles relating to Examples 5 to 10 were 90% or more so that the adsorbent particles relating to Examples 5 to 10 were able to exhibit sufficient adsorption capacities, respectively. The various conditions and the adsorption result were listed in Table 2.

TABLE 2

| | POLYMER | CERAMIC SHAPE | POROSITY (%) | ABSORPTION RATE OF OIL COMPONENT (%) |
|---|---|---|---|---|
| EXAMPLE 4 | POLYSTYRENE | HEXAHEDRON | 81.1 | 98.9 |
| EXAMPLE 5 | POLYVINYL BUTYRAL | OCTAHEDRON | 79.7 | 99.7 |
| EXAMPLE 6 | ACRYLONITRILE-STYRENE COPOLYMER | OCTAHEDRON | 80.8 | 92 |
| EXAMPLE 7 | POLYMETHYL METHACRYLATE | OCTAHEDRON | 83.2 | 99.5 |
| EXAMPLE 8 | POLYMETHYL ACRYLATE | OCTAHEDRON | 83.1 | 99.4 |
| EXAMPLE 9 | POLYSTYRENE-POLYBUTADIENE COPOLIMER | OCTAHEDRON | 77 | 99.2 |
| EXAMPLE 10 | POLYSTYRENE-POLYISOPRENE COPOLYMER | OCTAHEDRON | 74.3 | 98.6 |

As apparent from the results, it was turned out that even though the kind of polymer was changed, the adsorbent particles were able to exhibit sufficient oil adsorption capacity only if the adsorbent particles has a porosity of 70% or more.

Although the present invention was described in detail with reference to the above examples, this invention is not limited to the above disclosure and every kind of variation and modification may be made without departing from the scope of the present invention.

What is claimed is:

1. An oil adsorbent, comprising,
a plurality of particles, each particle comprising a core and a polymer covering the core, the core comprising a magnetic substance,
wherein the plurality of particles are aggregated to form an aggregate comprising pores so that a porosity of the aggregate is 70% or more.

2. The oil adsorbent as set forth in claim 1,
wherein the porosity of the aggregate is formed by an enlargement of a space between adjacent ones of the plurality of cores.

3. The oil adsorbent as set forth in claim 2,
wherein the core is shaped in polyhedron form.

4. The oil adsorbent as set forth in claim 3,
wherein the core is shaped in at least one of hexahedron form and octahedron form.

5. The oil adsorbent as set forth in claim 3,
wherein the core is formed through crystal growth from a reactive solution containing a constituent component of the core.

6. The oil adsorbent as set forth in claim 1,
wherein the magnetic substance is magnetite.

7. The oil adsorbent as set forth in claim 1,
wherein a size of the aggregate is set within a range of 5 to 200 μm.

8. The oil adsorbent as set forth in claim 1,
wherein the polymer contains as a main structure at least one selected from the group consisting of styrene, butadiene, isoprene, acrylonitrile, alkyl acrylate and alkyl methacrylate.

9. The oil adsorbent as set forth in claim 1,
wherein said oil adsorbent is made by means of splay dry.

10. The oil adsorbent as set forth in claim 9,
wherein said oil adsorbent is made using a polar solvent.

11. A method for recovering an oil, comprising,
recovering an oil in a water using an oil adsorbent as set forth in claim 1.

12. A method for recovering an oil, comprising,
recovering an oil in a water using an oil adsorbent as set forth in claim 1.

13. The oil adsorbent as set forth in claim 1, wherein said magnetic substance is at least one substance selected from the group consisting of iron, an alloy comprising iron, magnetite, titanic iron, magnesia ferrite, cobalt ferrite, nickel ferrite and barium ferrite.

14. The oil adsorbent as set forth in claim 1, wherein said magnetic substance of said core is a magnetic particle.

15. The oil adsorbent as set forth in claim 1, wherein said particles are combined with a binder.

16. The oil adsorbent as set forth in claim 1, wherein an average diameter of said particles are within a range of 0.05 to 100 μm.

17. The oil adsorbent as set forth in claim 1, wherein an average diameter of said particles are within a range of 0.2 to 5 μm.

* * * * *